(12) United States Patent
Wilson (10) Patent No.: US 7,716,295 B2
(45) Date of Patent: May 11, 2010

(54) RECIPIENT CLASSIFICATION MANAGEMENT UTILITY FOR E-MAIL REPLIES

(75) Inventor: Jeff K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 11/621,151

(22) Filed: Jan. 9, 2007

(65) Prior Publication Data

US 2008/0168360 A1 Jul. 10, 2008

(51) Int. Cl.
*G06F 13/00* (2006.01)
(52) U.S. Cl. ..................................... 709/206
(58) Field of Classification Search ............... 709/206, 709/217, 219, 223
See application file for complete search history.

(56) References Cited

U.S. PATENT DOCUMENTS

| | | | |
|---|---|---|---|
| 5,768,505 A | 6/1998 | Gilchrist et al. | |
| 6,301,245 B1 | 10/2001 | Luzeski et al. | |
| 6,633,630 B1 | 10/2003 | Owens et al. | |
| 6,789,107 B1 | 9/2004 | Bates et al. | |
| 6,915,332 B1 | 7/2005 | Zdepski | |
| 6,970,907 B1 * | 11/2005 | Ullmann et al. | 709/206 |
| 7,051,075 B1 * | 5/2006 | Machino et al. | 709/206 |
| 2004/0064734 A1 * | 4/2004 | Ehrlich | 713/201 |
| 2004/0221012 A1 * | 11/2004 | Heumesser | 709/206 |
| 2005/0076240 A1 * | 4/2005 | Appleman | 713/201 |
| 2006/0277263 A1 * | 12/2006 | Daniels et al. | 709/206 |
| 2007/0016644 A1 * | 1/2007 | Corona | 709/206 |
| 2008/0086530 A1 * | 4/2008 | Gandhi et al. | 709/206 |
| 2008/0120556 A1 * | 5/2008 | Bedingfield et al. | 715/752 |

* cited by examiner

*Primary Examiner*—Viet Vu
(74) *Attorney, Agent, or Firm*—Jill Poimboeuf, IBM; Scott Charles Richardson; The Brevetto Law Group (57) ABSTRACT

Methods and Systems are provided for managing the reply recipients field of a reply e-mail. In response to creating a reply e-mail the recipients are displayed in a format convenient for specifying their recipient classification. Typical recipient classifications include reply recipients (Reply To), carbon copy recipients (CC), blind carbon copy recipients (BCC) and/or file carbon copy recipients (FCC). The recipient classification for each e-mail address may be selected by an input from a user, such as mouse click, without the need to cut and paste e-mail addresses. The recipient classification display is updated in response to detecting a user selection, and an optional control is provided to specify the remaining unassigned recipients to one recipient status.

16 Claims, 6 Drawing Sheets

Manage E-Mail Recipients

|  | Reply To | CC | BCC |  |
|---|---|---|---|---|
|  | ☐ | ☑ | ☐ | jane@acme.com |
|  | ☑ | ☐ | ☐ | bob@acme.com |
|  | ☐ | ☐ | ☐ | steve@acme.com |
|  | ☑ | ☐ | ☐ | frank@acme.com |
|  | ☐ | ☐ | ☑ | joe@acme.com |

[ Done ]   [ Cancel ]

RECIPIENT CLASSIFICATION MANAGEMENT UTILITY FOR E-MAIL REPLIES

BACKGROUND

1. Field

The present invention relates to electronic communication, and more specifically systems and methods of communicating via e-mail.

2. Background

Today e-mail is a widely accepted a form of communication in most businesses and households. The vast majority of people who own computers or have Internet access use e-mail to communicate on a regular basis. E-mails can be the primary source of communication for businesses. Quite often a person who receives an email will be one of many listed on the e-mail's distribution list. If the person wants to reply to the email's group of recipients, or only some of the other recipients but not all of them, it can take considerable effort to cut and paste all the recipient's email addresses into the proper place designated on the email. It sometimes occurs that the person wants to reply to one or more of the recipients, but in a different manner than they originally received the email. For example, the person wants to reply to one or more of the recipients with a carbon copy (CC) of the email or a blind carbon copy (BCC), even though these people had previously been primary recipients (Reply To) of the original email. This can be very time consuming for people who receive and reply to dozens of group e-mails per day to make such changes in their reply emails.

What is needed is an e-mail application that ensures the sender of an e-mail is included in any subsequent replies to the e-mail forwarded e-mails based on the sender's original e-mail.

SUMMARY

Embodiments disclosed herein address the above stated needs by providing systems, methods and computer software for managing the recipient classifications of a reply e-mail. Various embodiments display the recipient information for each of the e-mail addresses while the recipient classifications are being managed. The recipient information includes an identifier such as an e-mail address, name or nickname of each recipient. The recipient information also includes a recipient classification for each recipient. The e-mail application program accepts an input to specify the recipient classification for a first e-mail address of the plurality of e-mail addresses. In some embodiments the input may be a mouse click over an input area in a pop-up window. The input is accepted without need to cut and paste the recipient's e-mail address. In response to receiving the input the display of recipient classification information is updated for each of the e-mail addresses in the reply e-mail.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
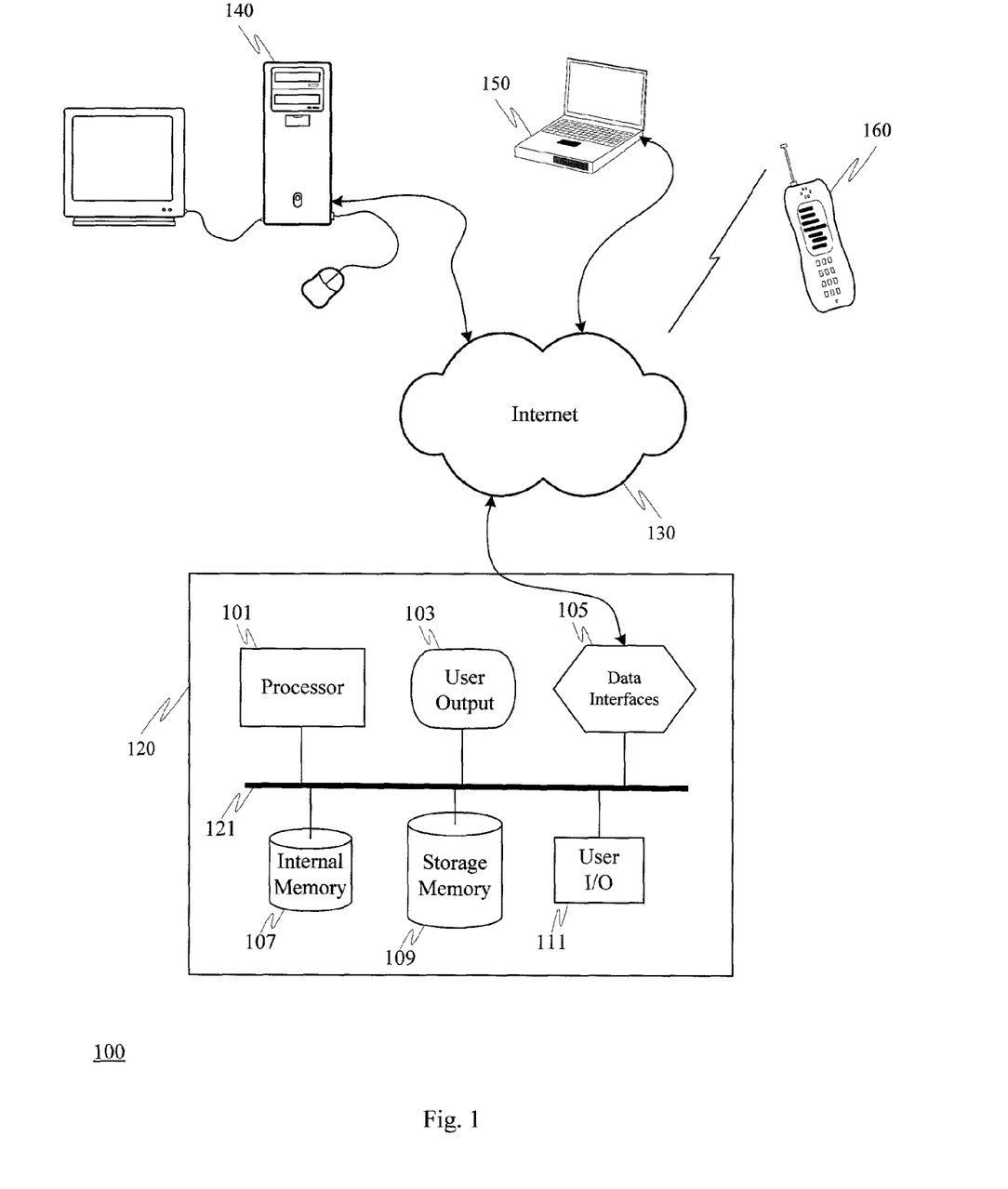
FIG. 1 depicts an exemplary system for practicing various embodiments of the invention.

FIG. 1 depicts an exemplary system 100 for practicing various embodiments of the invention. FIG. 1 shows a desktop computer system 140, a notebook computer 150 (sometimes called a laptop) and a wireless device 160 which may be embodied as a cellular telephone, a two-way pager, or other like type of wireless device for sending and receiving e-mail. These devices are included in the disclosure for illustration purposes only. In practice any device capable of sending and receiving e-mail may be configured to implement various embodiments of the invention. The communication device 120 depicts a block diagram with exemplary elements often included in the desktop computer system 140, the notebook computer 150 or the wireless device 160.

Each of the devices depicted in FIG. 1—the desktop computer system 140, the notebook computer 150, the wireless device 160, and the communication device 120—are configured to send and receive e-mail. E-mail is often sent via the Internet 130, as shown in FIG. 1, but may be sent using any suitable type of network or communication connection known to those of ordinary skill in the art. The desktop computer system 140, the notebook computer 150 and the communication device 120 are shown as being connected by wired connection to the Internet 130. The wireless device 160 is shown connected to the Internet via a wireless link such as a cellular telephone link or a two-way pager link. These devices, or any equivalent devices used to practice the invention, may either be connected by a wired connection, by a wireless connection, or may be connected using a combination of wired and wireless links.

The communication device 120 may include typical information handling system hardware such as the processor 101. The processor 101 may be implemented as a central processing unit (CPU) containing circuitry or other logic configured to perform or control the processes, steps and activities involved in practicing the embodiments disclosed herein. The processor 101 may be embodied as either a microprocessor or an application specific integrated circuit (ASIC), may be a combination of two or more distributed processors, or any other circuitry or logic capable of carrying out commands or instructions, for example, the commands or instructions in e-mail application software or other communication software. In various embodiments, the processor 101 may run a computer program or routine which performs one or more of the activities depicted in FIGS. 2 and 3, or otherwise discussed herein or known to those of ordinary skill in the art.

The processor 101 is interconnected to internal memory 107 and storage memory 109. The components of the communication device 120 are typically interconnected via one or more buses, represented in FIG. 1 as bus 121. For example, the processor 101 is configured to communicate with internal memory 107 and storage memory 109 via the bus 121 or by way of another like type of wired or wireless communication links. Although the bus 121 is depicted as a single bus connecting all of the component parts of the system, the communication device 120 may include two or more separate buses each connected to a subset of the system components.

The internal memory 107, sometimes referred to as a local memory, may be any of several types of storage devices used for storing computer programs, routines, or code, including the instructions and data for carrying out activities of the various embodiments such as the activities discussed herein. The internal memory 107 and storage memory 109 may be implemented in any form suitable for storing data in a computer system, for example, as random access memory (RAM), read only memory (ROM), flash memory, registers, hard disk, or removable media such as a magnetic or optical disk, or other storage medium known in the art. Either of the memories 107 and 109 may include a combination of one or more of these or other such storage devices or technologies. The internal memory 107 and storage memory 109 may each be configured to store all or parts of a computer program product which performs the various activities in forwarding an e-mail in accordance with the various embodiments.

The communication device 120 also includes one or more input/output (I/O) units such as user display output 103 and user input/output (I/O) device 111. The user output display 103 may be implemented in the form of any visual output device, and may be interfaced to bus 121 by a graphics adapter (not shown). For example, the user output display 103 may be implemented as a cathode ray tube (CRT) monitor, a liquid crystal display (LCD) screen, or other like type of display screen or monitor. Typically, the output 103 (e.g., computer screen) is configured to display a view controlled by the processor 101 running the e-mail application software. The user output 103 may include other output devices in addition to a video monitor, such as one or more LED indicator lights, or audio speakers, or other like type of output units.

The communication device 120 typically includes one or more user I/O devices 111 such as a keyboard, a mouse, a tablet surface and pen, a microphone and speech recognition routine, or other like types of input/output devices known to those of ordinary skill in the art. The user I/O device 111 may be interfaced to bus 121 by an I/O interface (not shown) and may be connected either by cables or wirelessly to the communication device 120. The user output 103 and user I/O 111 may include other devices known to those of ordinary skill in the art and suitable for use with a computer system or communication device for communicating data and commands between the communication device 120 and a user of the device.

The communication device 120 is typically configured to include one or more data interface units 105 suitable for connecting to one or more networks such as the Internet 130, a local area network (LAN), a wide area network (WAN), the Public Switched Telephone System (PSTN), a wireless telephone network, or the like. The data interface unit 105 may include a wired and/or wireless transmitter and receiver. The data interface unit 105 may be implemented in the form of multiple units, including, for example, a modem and/or a network adapter. The communication device 120 may be connected via a network (e.g., LAN, WAN, or the like) to one or more other information handling systems, computers, dumb terminals, or telecommunications devices which participate in running or carrying out instructions from the application, for example, to implement the various activities disclosed herein.

Figure 2:
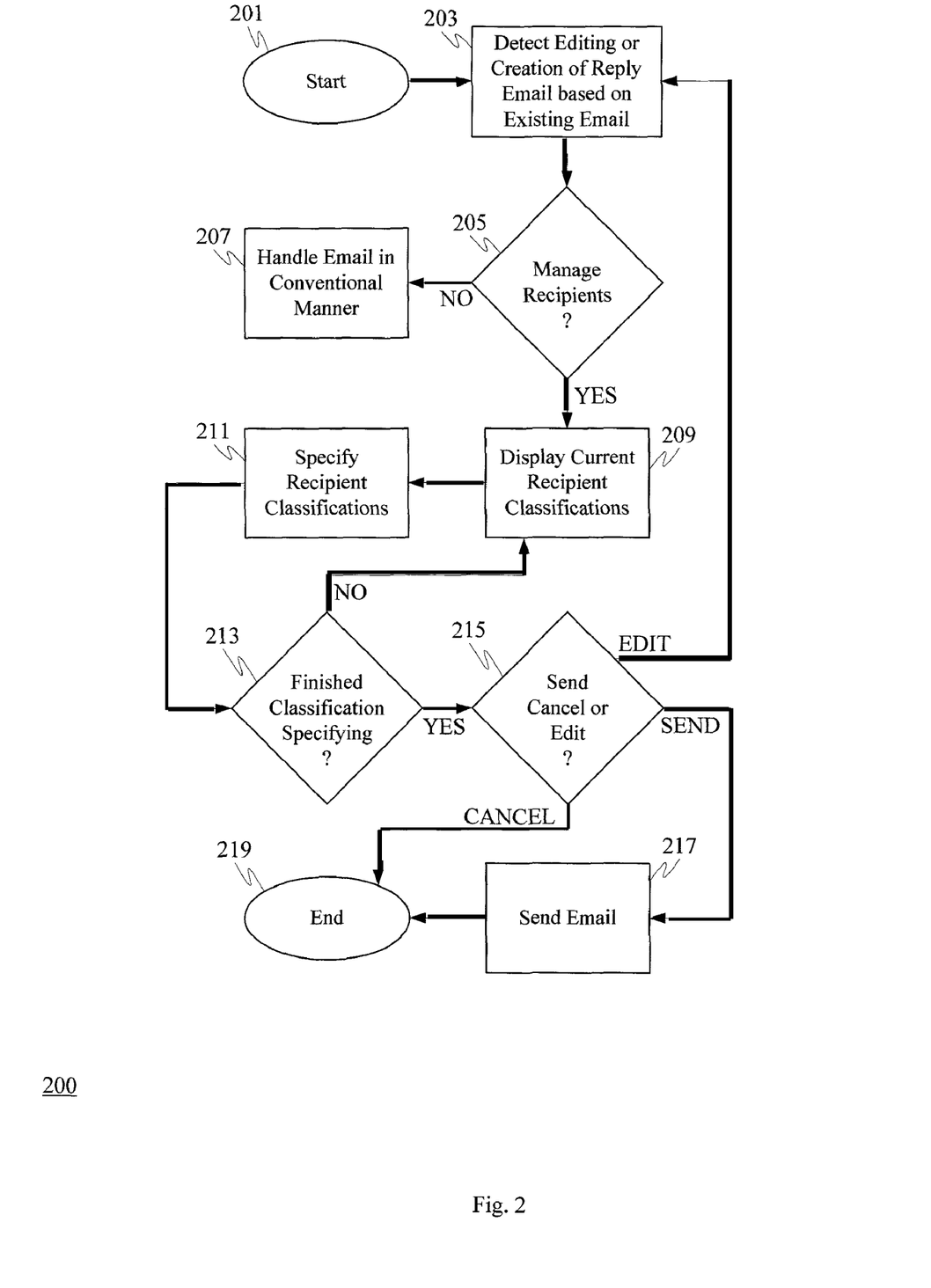
FIG. 2 depicts an exemplary method for practicing various embodiments for e-mail recipient status in a reply e-mail.

FIG. 2 depicts an exemplary method 200 for practicing various embodiments for e-mail recipient status in a reply e-mail. The method begins in 201 and proceeds to 203 where it is detected that a reply is being created, or edited, for an existing e-mail. The user may be replying to the sending or all the recipients of a received e-mail, or may be forwarding a previously received e-mail (or previously sent e-mail) to others. To reply to an existing e-mail, the user typically selects "Reply" or "Reply to All" button in the e-mail application program, or another control that results in the creation of a new e-mail addressed to some or all of the recipients of the existing e-mail. An e-mail created by clicking the "Reply" button is generally addressed to the sender of the existing e-mail. An e-mail created by clicking the "Reply to All" button is generally addressed to the sender and all the recipients of the original e-mail (even if the user was the sender, in some embodiments). For the purposes of this disclosure, the term "reply e-mail" includes any e-mail created on the basis of a previously received e-mail or an otherwise existing e-mail (including sent emails), for which the distribution list of the reply email is based upon the existing email. A reply email may be based on an email received by the user, a previously sent e-mail from the user, an e-mail included as an attachment in a previous e-mail, or the like. For example, a "reply e-mail" may be a reply to all or some of the recipients, and/or the sender, of the original e-mail, or a "reply e-mail" may be a forwarded e-mail based on the original received e-mail. The detection of a reply may occur in response to an existing e-mail being opened (or selected by right-clicking on it) and the user choosing the "Reply," "Reply to All," or "Forward" control of the e-mail application, or other like controls or buttons.

Once a reply e-mail is detected in 203 the method proceeds to 205 where it is determined whether or not the user desires to manage the recipients of the reply, and in particular manage the recipient classifications, in accordance with the various embodiments disclosed herein. The term "recipient classification," as this term is used herein conveys whether each recipient is specified to be a primary recipient of the reply, a carbon copy recipient ("CC" recipient), a blind carbon copy recipient ("BCC" recipient), or other type of recipient, e.g., a file carbon copy recipient ("FCC" recipient). A primary recipient (or regular recipient) is typically the person, or group of people, to whom the e-mail message is intended for—that is, the person/people for whom the text of the message was written. Depending upon the particular implementation, one of ordinary skill in the art would know that these terms may be known by other names so long as the distribution list is treated in the manner described herein for each of the above mentioned recipient classifications, Reply To, CC, BCC and FCC. The sender may also want others to see the message, and will often send CC recipient copies to those others so they will receive the message even though the text of the message is intended for the primary recipients. The primary recipient and CC recipients are displayed as part of the e-mail so that all recipients can see the identity of the primary recipients and CC recipients. The sender may also want others to see the message, but without their receipt being known to the other recipients. To do this the sender will send BCC recipient copies to those others, so they will receive the message but without their identity being disclosed to the other recipients. An email sent to an FCC recipient is generally sent to a predefined folder within the sender's own email application program, or sent to another person (e.g., personal assistant or secretary) designated to maintain copies of emails.

Returning to 205, if the reply recipients are not to be managed according to the embodiments herein the method proceeds from 205 along the "NO" path to 207 and any editing of the e-mail addresses is handled in a conventional manner, e.g., cutting and pasting addresses. However, if it is determined in 209 that the e-mail addresses are to be managed according to the various embodiments herein the method proceeds to 209 along the "YES" branch. In some embodiments, upon determining in 205 that the recipients are to be managed, the e-mail application program may provide a prompt on the display screen inquiring about whether the user wants to begin managing the e-mail recipient classifications. In other embodiments the e-mail application program is configured to begin managing the e-mail recipient classifications according to the various embodiments without need for a user prompt. In yet other embodiments the e-mail application program is configured to begin managing the e-mail recipient classifications only after receiving a command from the user to do so, for example, detecting a user input to a button or other input area designated to launch a pop-up window or other process for managing the recipient classifications. In any event, once the email application program determines that the user desires to manage the recipient classifications the method proceeds from 205 to 209.

Figure 3A:
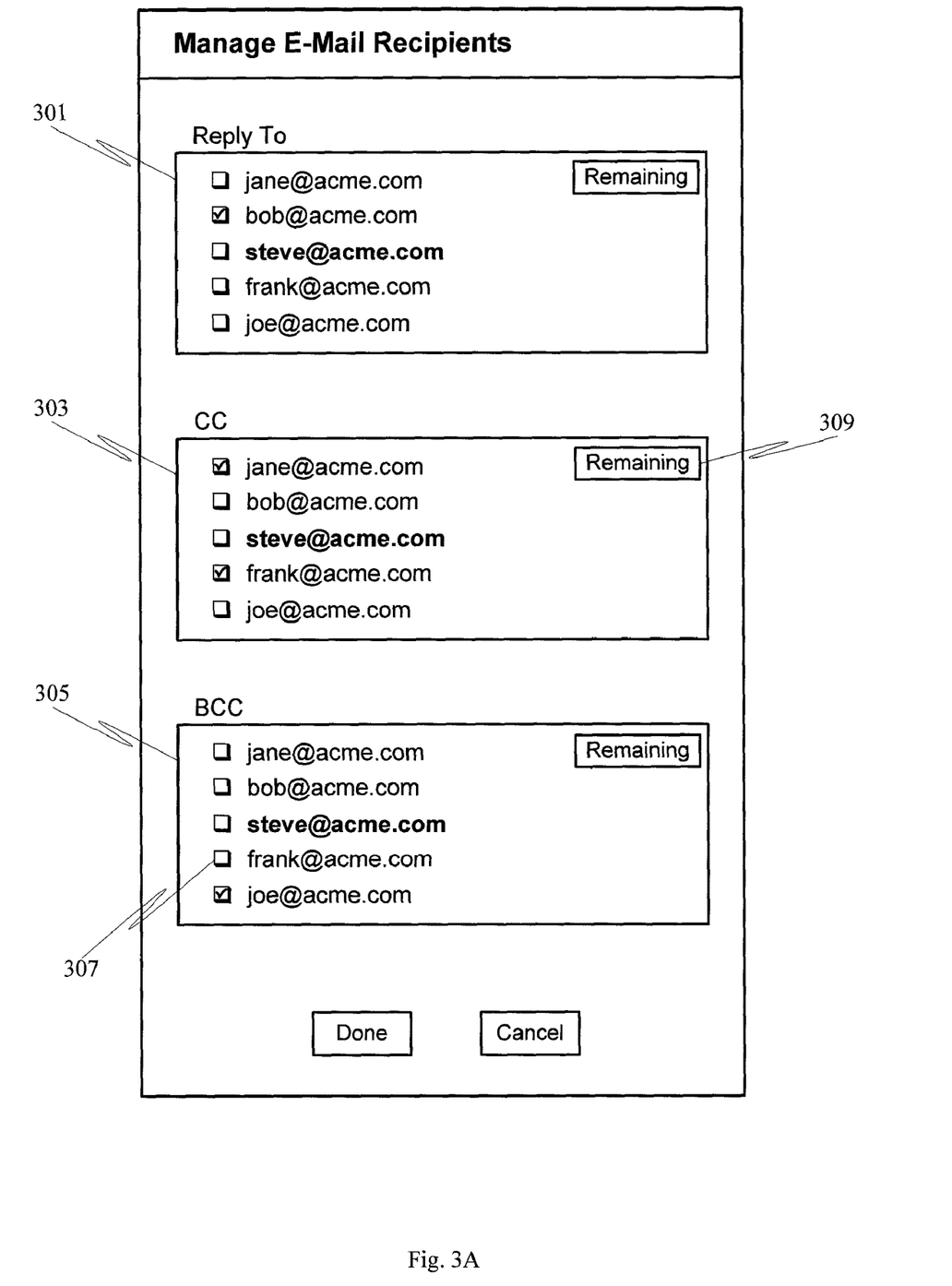
FIGS. 3A-D depict exemplary configurations for accepting a user input to specify a recipient classification.

In 209 the current e-mail recipient information including the recipient classifications are displayed. The e-mail's "recipient information," as this term is used herein, includes the e-mail addresses or other representations of the recipients, as well as an indication of the recipient classification, that is, whether the email is to be sent as a Reply To, a CC email or a BCC email. FIG. 3A depicts an example of recipient classifications being displayed in accordance with one embodiment. The e-mail application program may provide a pop-up window similar to that of FIG. 3A with the recipient classification information for the reply e-mail. In 209, for recipients that have already been categorized in a recipient classification this information is displayed. However, it may be the case that a recipient has not yet been categorized with any particular recipient classification. In such situations a display area for displaying a recipient classification associated with each identifier is shown. For example, referring to FIG. 3A, a blank check-box is shown next to the identifier for Steve. Since the check box is blank in each of the recipient classification areas—Reply To area 301, CC area 303, and BCC area 305—it indicates that there is no recipient classification yet assigned to Steve's email identifier.

As mentioned above, the e-mail's recipient information includes the e-mail address or other identity representation of the recipient, in addition to the recipient classification (except for BCC recipients whose recipient identify remains hidden). It should be noted that the identity of the recipient can be displayed in various forms. For example, the full e-mail address can be displayed, as shown in FIG. 3A (e.g., "jane@acme.com"). Alternatively, a person's name associated with the e-mail address may be shown (e.g., "Jane Smith") or a nickname or handle for the person (e.g., Jane at Acme), either in combination with the email address or in place of it. If the person's name or nickname is used to identify the e-mail recipients, typically their e-mail address can be discovered by selecting or clicking on the name/nickname, or right-clicking on the e-mail identity and using a drop-down menu to reference the e-mail address. The e-mail identifications being displayed and managed may include group e-mail representations associated with two or more e-mail addresses. For example, in FIG. 3A it could be the case that Jane and Bob are sales people for Acme, and both Jane and Bob's email addresses could be included in a single group email identity labeled "Acme Sales Staff." A group e-mail identity may be displayed, managed and classified in the same manner as an individual e-mail identity. Returning to 209, the displayed recipient classification for an e-mail address may also include an indication that the e-mail address has not yet been categorized with any particular recipient classification. Once the current recipient classifications, including any updated classifications, have been displayed in 209 the method proceeds to 211 where the sender is allowed to specify the recipient classifications.

In 211 the actual system and method for specifying the recipient classifications may vary depending upon the implementation. This can be seen by comparing the exemplary embodiments shown in FIGS. 3A-D. However, the various embodiments for specifying the classification all have one thing in common: they do not require cutting and pasting the recipient e-mail addresses as is done in conventional e-mail applications. In the various embodiments disclosed herein the e-mail application accepts an input from a user such as detecting a mouse click in a box of the pop-up window which specifies the recipient for a given classification. The exemplary embodiments shown in FIGS. 3A-D accept inputs from the sender in three different manners, none of which entails copying and pasting. In FIG. 3A there are three different areas in the pop-up window that list reply recipients, each area being associated with a different recipient classification. The area 301 is for specifying the "Reply To" recipients, or primary recipients, of the e-mail. These are the recipients to whom the e-mail message is intended for. Quite often written text message refers to the primary recipients (Reply To recipients), but not to the CC or BCC recipients (e.g., "Dear Bob,"). Similarly, the area 303 is for specifying the CC recipients and the area 305 is for specifying the BCC recipients.

Returning to 211, once the recipient classifications have been specified the method proceeds to 213 to determine whether the process of managing the recipient classifications is done. If it is determined in 213 that the recipient classification process is not yet done, then the method proceeds along the "NO" branch back to 209 to update and display the current recipient classifications. Depending upon the particular implementation the recipient classifications may be displayed in 209 as they would upon sending the e-mail, or they may be displayed in the manner during the editing process of 211 (e.g., displayed as shown in FIGS. 3A-D). In either case, the method then loops back to 211 for further specifying or changing of the recipient classifications. Back in 213 if it is determined that the user has completed the process of specifying the recipient classifications then the method proceeds to 215.

In 215 it is determined whether the user wants to further edit the e-mail, send the e-mail or cancel it. If the user chooses to cancel the e-mail the method proceeds from 215 along the "CANCEL" path to 219 and ends. If the user desires to further edit the e-mail, change some parameters, or simply start over, the method proceeds from 215 along the "EDIT" path to 203 for further editing of the e-mail. However, if the user chooses to send the e-mail the method proceeds from 215 along the "SEND" path to 217. In 217 the e-mail is sent (or attempted to be sent) to each of the various recipients in accordance with each one's recipient classification. By "sent" it is meant that the e-mail is directed out over a network or other communication link towards the recipient, regardless of whether the recipient actually receives it (e.g., because the recipient's e-mail address is wrong, the communication link is down, or the recipient is otherwise unavailable). Once the e-mail has been sent to the various recipients the method proceeds to 219 and ends.

Figure 3B:
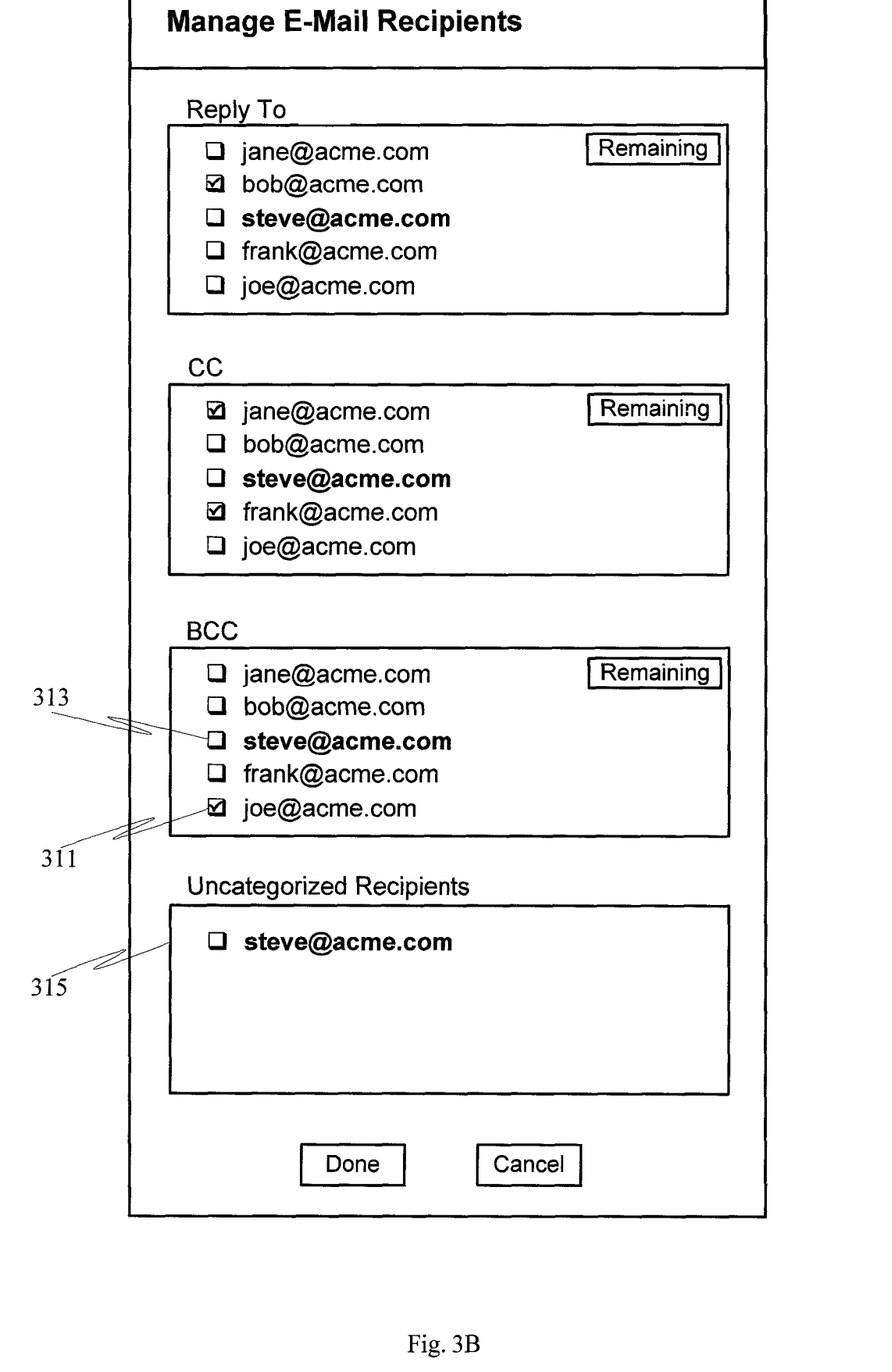

FIGS. 3A-D depict exemplary configurations for accepting a user input to specify a recipient classification. FIG. 3A depicts recipient classifications being displayed, for example, in a pop-up window of a GUI-based e-mail application program. As shown in the figure the various e-mail recipients may be displayed in areas within the window associated with each of the recipient classifications. In the embodiments of FIGS. 3A and 3B there is a Reply To area 301 for selecting the Reply To classifications, the primary recipients of the e-mail. There is also a CC area 303 and a BCC area 305 for selecting the CC classifications and BCC classifications, respectively. Within each of the classification areas 301, 303 and 305 there are input areas associated with each e-mail address. If a user selects an input area within a given classification, the e-mail address becomes associated with that recipient classification.

For example, the e-mail address frank@acme.com is presently classified as a CC recipient as indicated by the checked box in the input area associated with frank@acme.com in 303 of FIG. 3A. If a user selects input area 307 then frank@acme.com will become a BCC recipient rather than a CC recipient. For a typical GUI based e-mail application a user may select an input area by manipulating a cursor over the input area and clicking (or double clicking) the cursor. Those of ordinary skill in the art would know of other input devices (e.g., touchpad, arrow keys, pen and tablet, or the like) that may use other methods of selecting (e.g., touching the screen, hitting the "Enter" key, or the like).

Another feature of various embodiments is the feature to specify the remaining recipient classifications. Referring to FIG. 3A each of the groupings of classification—that is, the Reply To grouping, the CC grouping, and the BCC grouping—is shown with a "Remaining" button such as remaining button 309. A user may want to designate a number of the recipients to be various particular classifications, and then use the Remaining button 309 to complete the recipient information by specifying the remaining unclassified recipients all to the same classification. For example, if the user selected Remaining button 309 with the setting presently shown in FIG. 3A, then steve@acme.com (the sole unclassified recipient) would be specified to receive a CC copy of the e-mail in addition to the other CC recipients, Jane and Frank. In the example shown in FIGS. 3A-B, this would not save much time since Steve is the only unclassified recipient. However, in an email with twenty or more e-mail addresses listed on the distribution list, then there may be significant time savings realized by having the ability to select the Remaining button, a feature that allows the distribution classifications to be completed with a single user input.

Figure 3C:
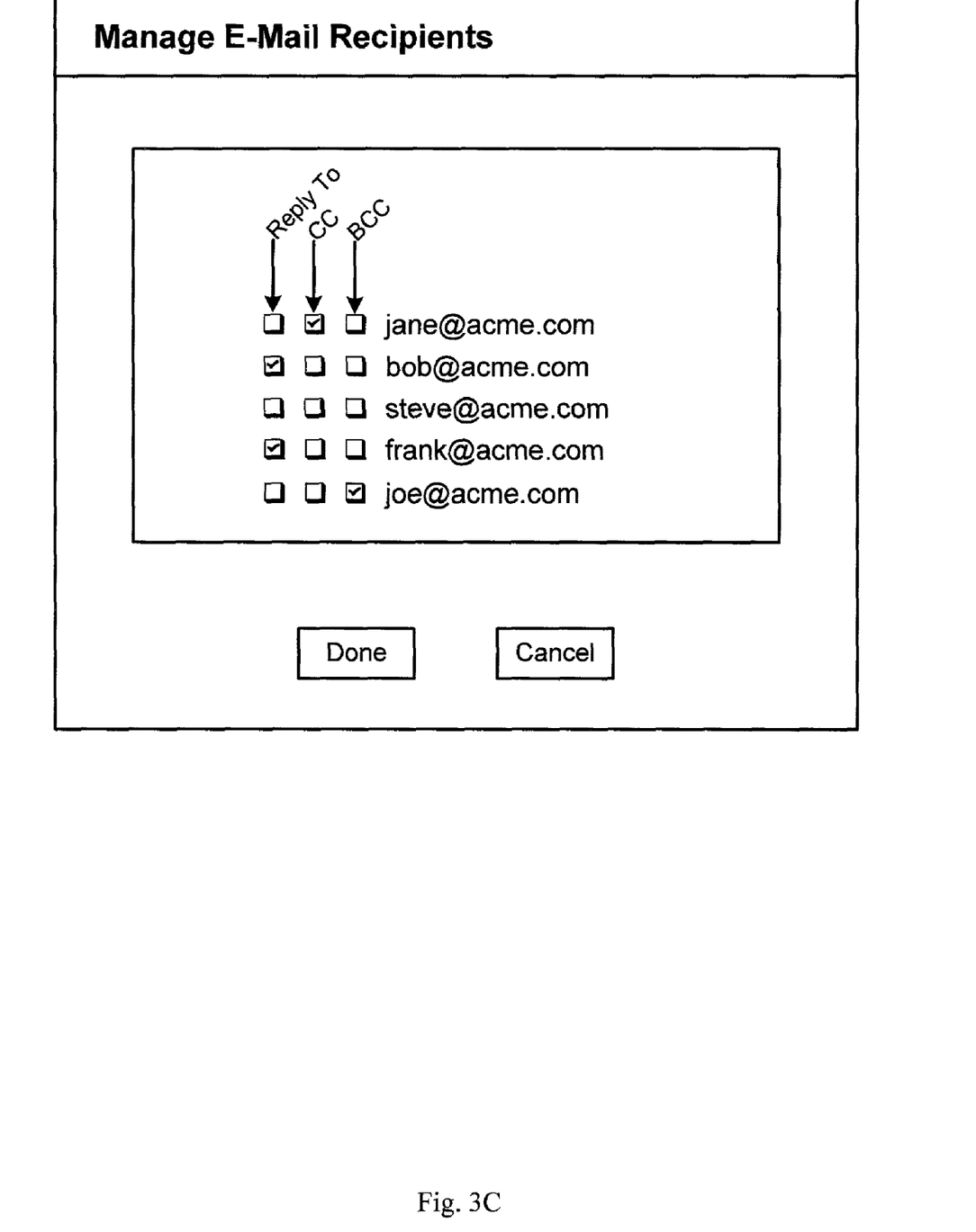

In the various embodiments, the display attributes of an e-mail identity typically change in response to selecting (e.g., bolding the text). FIGS. 3A-3C show the e-mail identity having a checked box next to it indicating that the input area has been selected. For example, FIG. 3B shows a checked box 311 next to joe@acme.com in the BCC area, indicating that joe@acme.com is a BCC e-mail recipient. A checked box is one way of delineating the recipient classification. It should be noted that the attributes or convention for displaying the classification status does not necessarily need to coincide with the input area. For example, the input area could be the small boxes next to each e-mail address, and the indicator for a particular recipient classification status could be a change in the display attributes of the e-mail identifier such as showing the text in a different color, in bold, underlined, in uppercase letters, or any other changed display attribute signifying that the e-mail address is selected. FIGS. 3A and 3B show e-mail addresses which have not yet been specified to a recipient classification as being bolded. This can be seen by looking at steve@acme.com, which is shown in bold characters, in FIG. 3A. FIG. 3B also delineates the e-mail addresses that remain uncategorized within region 315 that provides a list of them. It is often visually convenient to users to have such a list of recipients who remain uncategorized, rather than having to refer to each category to see whether a particular e-mail address has received a recipient classification or not.

FIG. 3C depicts another embodiment for displaying the recipient classification of the various e-mail recipients. In this embodiment the e-mail identities are listed in one group and are associated with several check boxes or other input areas, each one of the input areas being associated with a recipient classification (e.g., Reply To, CC or BCC). In the figure the check boxes are shown in a row adjacent the email recipient's identity. However, the check boxes or other input areas may be arranged in any configuration, preferable so it is intuitive that they are associated with a particular email recipient identity. In the embodiment of FIG. 3C a user can manage the recipient classification by simply checking a box (or otherwise selecting an input area) associated with the e-mail identity.

Figure 3D:
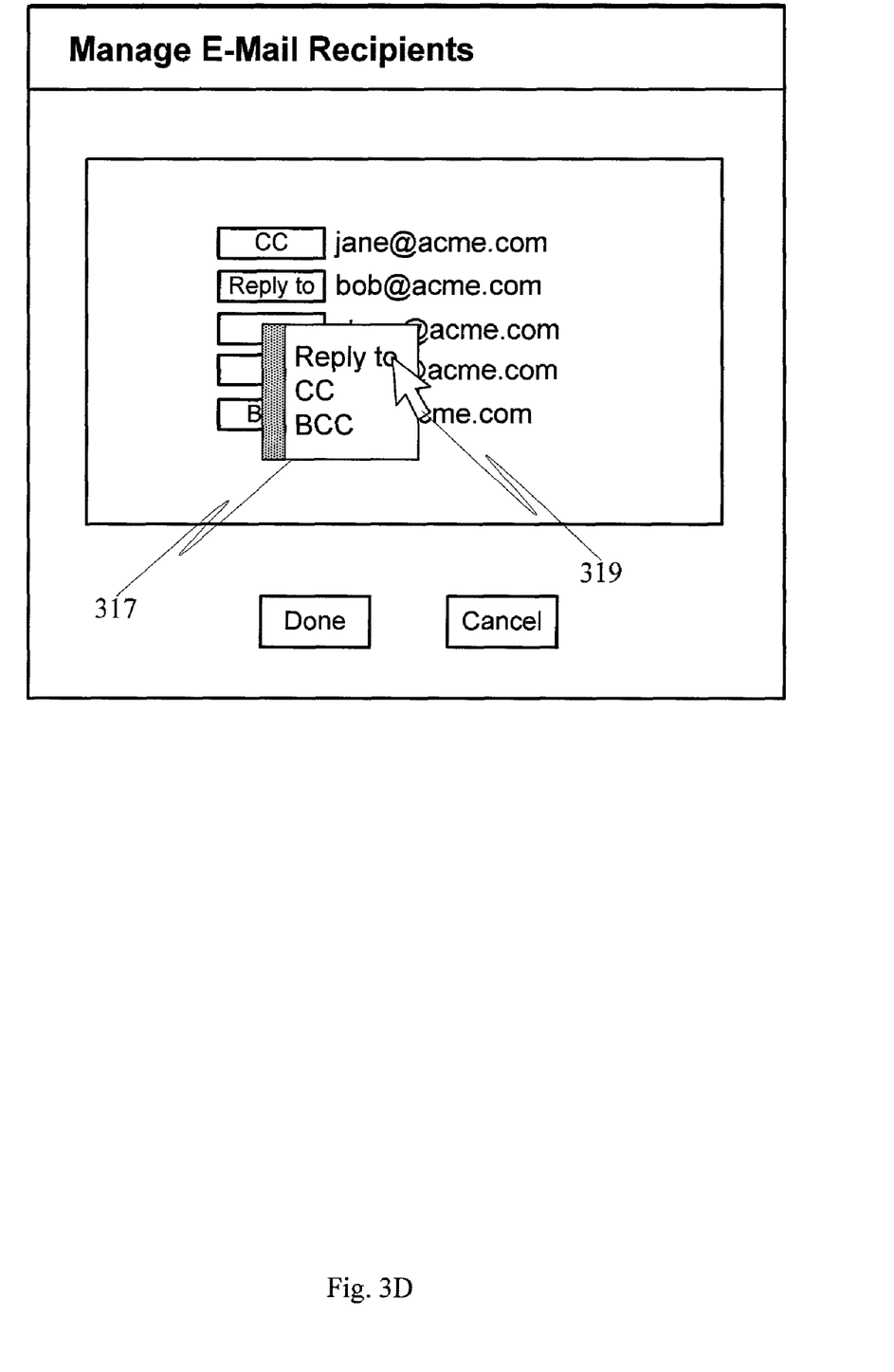

FIG. 3D depicts another embodiment that uses a drop down menu system for categorizing e-mail recipients to a particular recipient classification. In this embodiment a drop down menu is available for each recipient identification, for example, as can be seen with the drop down menu 317 associated with steve@acme.com. In a GUI-based e-mail application program such a drop down menu may typically be accessed by right-clicking on the recipient identifier (e.g., e-mail address or name) or the selection area associated with the recipient identifier. The drop-down menu provides a list of the recipient classifications that are available for the e-mail recipient. Typically, such a drop-down menu is configured to accept an input from a user. For example, the user may manipulate a mouse to position a cursor 319 over the desired recipient classification in the drop down menu and click or double-click a mouse button to select it. Upon being selected, the display area will reflect the recipient classification status for that e-mail address, e.g., Reply To, CC or BCC.

The various embodiments of the invention include a systems, methods and software instructions for accepting inputs from a user to specify the recipient classification of the various recipients of a reply e-mail. The various embodiments do not require that information be cut and pasted in the e-mail in order to specify the recipient classifications. Instead, the various embodiments accept an input from the sender such as using a mouse to check a box on a pop-up window, as shown in FIGS. 3A-C. In other embodiments various other inputs to specify the recipient classification may be used. The other inputs may include, for example, a drop down menu associated with the recipient identification as the drop down menu shown in FIG. 3D, or other methods or means of accepting a user input as are known to those of ordinary skill in the art.

Various embodiments may be implemented in, or in conjunction with, a number of different e-mail applications, including but not limited to: Lotus Notes, Microsoft Outlook, Eudora, Mozilla Thunderbird, Pegasus, Claris, Blitzmail, Pronto Mail, Mutt, Pine, or other like types of e-mail applications known to those of ordinary skill in the art. The email application may either be stored on a user's computer or other communication device, or the email application program may be an Internet application (e.g., Yahoo mail, Google's Gmail, or the like) accessed via the Internet. In some embodiments, several or all of the functions outlined above for practicing the invention may be carried out either in the e-mail application program itself or by an application program, routine or other logic working in conjunction with the e-mail application. Various "buttons" are mentioned throughout the specification, for example, the "Reply" button, "Reply to All" button, "Forward" button, "Send" button, and so on. The term "button" as used herein means any control of a computer application program that a user may select, control, or toggle, for example, a control of a GUI based application. A button may be a menu button, a button on a drop-down menu, a button on a pop-up window prompt, or any other such control subject to user input. For example, a user may control a GUI-based computer application program by clicking on a "button" with a mouse or other user input device.

The invention may be implemented with any sort of processing units, processors and controllers (e.g., processor 101 of FIG. 1) capable of performing the stated functions and activities. For example, the processor 101 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the storage memory 109, e.g. hard disk, CD, flash memory, ram, or other computer readable medium as recognized by one of ordinary skill in the art, or the computer software programs may be transmitted wirelessly to the processing unit.

An e-mail application for implementing the various embodiments may operate with any type of operating system (OS). For example, e-mail application programs commonly run on graphical user interface (GUI) based operating systems such as Windows® Millenium Edition, Windows® XP, Linux, or the like. The computer application or software programs can aid or perform the steps and activities described above. For example computer programs in accordance with at least one exemplary embodiment may include: source code for associating a locked distribution list to a first e-mail; source code for sending the first e-mail to e-mail addresses on the locked distribution list; source code for configuring the first e-mail and the locked distribution list so that a reply e-mail must include the locked distribution list; as well as other features of the various embodiments.

The e-mail application program may be any program, routine or code that allows a user to send, receive and organize e-mail. The e-mail application program may sometimes be called an e-mail client and can run on a personal computer, a workstation, or other type of communication device capable of sending e-mail. It is sometimes known as an e-mail client because e-mail systems often have a client-server architecture, with e-mail being sent from clients to a central server and then routed to the specified destination.

The use of the word "exemplary" in this disclosure is intended to mean that the embodiment or element so described serves as an example, instance, or illustration, and is not necessarily to be construed as preferred or advantageous over other embodiments or elements. The term "recipients," as this term is used herein, is intended to mean one that receives an e-mail. For ease of explanation, a "recipient" has been discussed in terms of a person receiving an e-mail. In practice, however, an e-mail application program (e.g., MicroSoft Outlook) actually receives the e-mail and displays it for the benefit of a person, with the program typically being under the control of the person. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of managing recipient information for a reply e-mail, the method comprising:
    displaying the recipient information for each of a plurality of e-mail addresses for the reply e-mail, said recipient information including an identifier for each of the plurality of e-mail addresses and a display area for displaying a recipient classification associated with each identifier;
    accepting an input selecting an input area to specify the recipient classification for a first e-mail address of the plurality of e-mail addresses, said input area being associated with the first e-mail address; and
    updating the display of the recipient information to include the recipient classification for the first e-mail address;
    wherein said recipient information is configured for displaying an indication that the recipient classification for a second e-mail address has not yet been specified.

2. The method according to claim 1, wherein the reply email is based on an existing email and the plurality of recipient e-mail addresses of the reply e-mail is based on a distribution list of the existing e-mail.

3. The method according to claim 1, wherein the input area being selected includes detecting a mouse click on the input area.

4. The method according to claim 1, wherein the input to specify the recipient classification does not include cutting and pasting the first e-mail address.

5. The method according to claim 1, wherein the display is provided in a pop-up window That includes the input area.

6. The method according to claim 1, wherein the recipient classification for the first e-mail address is selected from a group consisting of a Reply To classification, a Carbon Copy classification, a Blind Carbon Copy classification and a File Carbon Copy classification.

7. The method according to claim 1, wherein the displaying of the recipient information further includes displaying a first area associated with a Reply To classification and a second area associated with a Carbon Copy classification, said first and second areas each including a list of the plurality of e-mail addresses with an indication of the recipient classification for each of the plurality of e-mail addresses.

8. A software product comprising an electronically readable medium including a program of instructions, wherein the program of instructions upon being executed on a device causes the device to:
    display recipient information for each of a plurality of e-mail addresses for a reply e-mail, said recipient information including an identifier for each of the plurality of e-mail addresses and a display area for displaying a recipient classification associated with each identifier;
    accept an input selecting an input area to specify the recipient classification for a first e-mail address of the plurality of e-mail addresses, said input area being associated with the first e-mail address; and
    update the display of the recipient information to include the recipient classification for the first e-mail address;
    wherein said recipient information is configured for displaying an indication that the recipient classification for a second e-mail address has not yet been specified.

9. The software product according to claim 8, wherein the reply email is based on an existing email and the plurality of recipient e-mail addresses of the reply e-mail is based on a distribution list of the existing e-mail.

10. The software product according to claim 8, wherein the display is provided in a pop-up window that includes the input area.

11. The software product according to claim 8, wherein the recipient classification for the first e-mail address is selected from a group consisting of a Reply To classification, a Carbon Copy classification, a Blind Carbon Copy classification and a File Carbon Copy classification.

12. The software product according to claim 8, wherein the displaying of the recipient information further includes displaying a first area associated with a Reply To classification and a second area associated with a Carbon Copy classification, said first and second areas each including a list of the plurality of e-mail addresses with an indication of the recipient classification for each of the plurality of e-mail addresses.

13. A system configured for managing recipient information for a reply e-mail, the system comprising:
- an electronically readable storage medium configured to store an e-mail application program;
- a display device configured to display the recipient information for each of a plurality of e-mail addresses for the reply e-mail, said recipient information including an identifier for each of the plurality of e-mail addresses and a plurality of display areas associated with the identifier for each of the plurality of e-mail addresses, each one of the plurality of display areas being respectively associated with one of a plurality of recipient classifications comprising a Reply To classification, a Carbon Copy classification, and a Blind Carbon Copy classification; and
- a user input device responsive to user inputs configured to accept an input selecting an input area associated with a first e-mail address to specify one of the plurality of recipient classifications for the first e-mail address of the plurality of e-mail addresses, wherein the input to specify said one of the plurality of recipient classifications includes one of a plurality of input areas for the reply email being selected, each one said plurality of input areas being respectively associated with one of the plurality of recipient classifications;
- wherein the display of the recipient information is updated to include the recipient classification specified for the first e-mail address; and
- wherein said recipient information is configured for displaying an indication that the recipient classification for a second e-mail address has not yet been specified.

14. The software product according to claim 8, wherein the input area being selected includes detecting a mouse click on the input area.

15. The method according to claim 1, wherein the displaying of the recipient information comprises displaying the recipient information in the reply e-mail; and
- wherein said input area is one of a plurality of input areas for the first e-mail address, each one of the plurality of input areas being respectively associated with one of a plurality of recipient classifications available for the first e-mail address comprising a Reply To classification, a Carbon Copy classification and a Blind Carbon Copy classification.

16. The software product according to claim 9, wherein the displaying of the recipient information comprises displaying the recipient information in the reply e-mail; and
- wherein said input area is one of a plurality of input areas for the first e-mail address, each one of the plurality of input areas being respectively associated with one of a plurality of recipient classifications available for the first e-mail address comprising a Reply To classification, a Carbon Copy classification and a Blind Carbon Copy classification.

* * * * *